Patented Mar. 10, 1942

2,275,413

UNITED STATES PATENT OFFICE 2,275,413

SULPHURIC DERIVATIVES OF ETHERS

Heinrich Bertsch, Chemnitz, Germany, assignor to American Hyalsol Corporation, Wilmington, Del., a corporation of Delaware No Drawing. Application September 24, 1937, Serial No. 165,509. In Germany September 20, 1929

14 Claims. (Cl. 260—458)

This invention relates to wetting, penetrating, foaming and dispersing agents.

The sulphonation products of the higher aliphatic alcohols and the water soluble salts of the said sulphonation products are already known and have been used in the arts to considerable extent as wetting, penetrating, foaming and dispersing agents.

In accordance with the present invention, the sulphonation and sulphation products hereinafter referred to collectively as "sulphuric reaction products" of ethers of aliphatic alcohols' with aliphatic, unsaturated or polyvalent alcohols, containing more than eight carbon atoms in an aliphatic chain and the water soluble salts of these sulphuric reaction products are employed, for these compounds also are admirably suited for the said purposes. The ethers containing lower alkyl radicals, for example from the methyl compounds up to and including the amyl compounds, are particularly suitable. The sulphuric reaction with the lower alkyl ethers of the alcohols of the fatty series has the advantage over the sulphuric reaction with the alcohols themselves, that the lower alkyl ethers are more mobile than the corresponding higher alcohols. This is of importance as the process of stirring is facilitated thereby, especially when operating at low temperatures, and the action of the sulphonating and sulphating agent is rendered more uniform.

The preparation of the sulphuric reaction products according to this invention, may be effected by first preparing the alkyl ether from the unsaturated or polyvalent alcohol by alkylating the latter in the usual manner. The present invention, however, is independent of the method by which the ethers themselves are prepared, for any of the conventional methods are satisfactory. They may be prepared also by condensing two alcohols with the aid of condensing agents, as is described in Whitmore's "Organic Chemistry," 1937, pages 149 and 154. The ether may be considered in all instances as being prepared from any alcohols or combination of alcohols so long as one of the alcohols contains more than 8 carbon atoms and the same or the other alcohol contains at least one double bond, or one hydroxy radical in addition to the hydroxy radical involved in the condensation reaction whereby the ether is formed. The ethers which contain double bonds or free hydroxyl groups are then treated with sulphonating and sulphating agents, for example, concentrated sulphuric acid, oleum, chlorsulphonic acid, if necessary in the presence of water-fixing agents, such as inorganic or organic acid anhydrides or acid chlorides. According to the reaction conditions obtaining either sulphuric acid esters or true sulphonic acids of the alkyl ethers of aliphatic alcohols, are formed. Under mild conditions, such as described in Examples 1 and 2 below, wherein the reaction takes place at room temperatures, preferably in the presence of a water-insoluble organic solvent, principally sulphuric acid esters or sulphates are formed. Under energetic conditions, such as set out in Example 3 wherein the sulphonating and sulphating agent is used in excess in the presence of water fixing or binding agents, principally true sulphonic acids are formed.

The position which the sulphuric or sulphonic acid groups occupy on the ether molecule is naturally dependent upon the position of the double bond or bonds or that of hydroxy group or groups in or on the original ether molecule. In the treatment of ethers of high molecular weight prepared from polyvalent alcohols having two or more hydroxy radicals, for example glycols, with aliphatic alcohols the sulphate group will join to the glycol radical of the ether whether the said radical be of low molecular weight or of high molecular weight.

Examples 1. 320 kgms. of octadecenyl-n-butylether are sulphated at about 15° C. with 200 kgms. of concentrated sulphuric acid. The resulting oily product, which is readily soluble in water, is pressed on ice, washed with saturated Glauber's salt solution in order to remove the excess of sulphuric acid and then neutralized with soda lye.

2. 300 kgms. of octadecylene glycol monomethylether, which may be prepared by reducing hydroxystearic acid ester and methylating the resulting product, is dissolved in 200 kgms. of trichlorethylene and sulphated at room temperature with 120 kgms. of chlorsulphonic acid. The product is pressed on ice, washed with saturated Glauber's salt solution in order to remove the excess of sulphuric acid and hydrochloric acid and then neutralized with caustic soda. Similar compounds may be prepared by sulfating propylene glycol monomyristyl ether and other lower or higher molecular polyhydroxy monoalkyl ethers.

3. 300 kgms. of octadecenyl - isopropylether are sulphonated at 10° C. with 300 kgms. of concentrated sulphuric acid and 100 kgms. of acetic anhydride. The product is pressed on ice, washed with Glauber's salt solution in order to remove the excess of sulphuric acid and acetic acid and finally neutralized with soda lye.

The resulting products of the foregoing process are very stable bodies, which have strong wetting and foaming properties. The true sulphonic acids (Example 3), do not split off the combined sulphuric acid even on prolonged boiling in the presence of saponifying agents. On dry heating to high temperatures also these products do not split off the sulphuric acid, a fact which is of considerable importance in the calendering of textile goods. When employing ordinary Turkey red oils for the purpose the fibres are, as is known, frequently injured.

The sulphuric reaction products of the lower alkyl ethers and other ethers described herein of the fatty alcohols may, therefore, be advantageously employed as such or in admixture with other substances, such as aromatic sulphonic acids or their salts, soaps or fat solvents (e. g. hydrocarbons or halogen derivatives of hydrocarbons), wherever wetting penetrating, cleansing, foam production, dispersing and transference of active constituents are required. The products are particularly suitable for use in the textile and leather industries, the pharmaceutical industry, the preparation of vermicides as well as of treatment liquids for metal working, for example bore oils, and also for the splitting of fats.

4. 2 parts of the product obtained according to Example 1 are dissolved in 100 parts of water. A clear solution having good foaming properties is obtained, which rapidly wets fibrous substances, such as wool or cotton, and also completely penetrates compact materials in a very short time.

5. 1 part of the product obtained according to Example 2 is dissolved in 100 parts of soda lye of 30° Bé. When this bath is employed for mercerising cotton very rapid and uniform mercerization is effected even without previously boiling the cotton.

6. 3 parts of the product prepared according to Example 3 are dissolved in 1000 parts of sulphuric acid, of 4° Bé. A carbonizing bath having admirable wetting properties is obtained.

This application is a continuation-in-part of the applicant's copending application, Serial Number 472,762, filed August 2, 1930.

I claim:

1. The process of preparing wetting and dispersing agents comprising reacting a sulphonating and sulphating agent with an ether selected from the group consisting of the lower alkyl ethers of aliphatic unsaturated alcohols having more than eight carbon atoms and the lower alkyl ethers of aliphatic polyhydroxy alcohols having more than 8 carbon atoms, said ether having at least one free group esterifiable with sulphuric acid.

2. The process of preparing wetting and dispersing agents comprising reacting concentrated sulphuric acid at a temperature not exceeding 35° C. with an ether selected from the group consisting of the lower alkyl ethers of aliphatic unsaturated alcohols having more than eight carbon atoms and the lower alkyl ethers of aliphatic polyhydroxy alcohols having more than 8 carbon carbon atoms, said ether having at least one free group esterifiable with sulphuric acid.

3. The process of preparing wetting and dispersing agents comprising reacting a sulphonating and sulphating agent selected from the group consisting of sulphur trioxide, oleum, and chlorosulphonic acid with an ether selected from the group consisting of the lower alkyl ethers of aliphatic unsaturated alcohols having more than eight carbon atoms and the lower alkyl ethers of aliphatic polyhydroxy alcohols having more than 8 carbon atoms, said ether having at least one free group esterifiable with sulphuric acid.

4. The process of preparing wetting and dispersing agents comprising reacting a sulphonating and sulphating agent in the presence of a water insoluble organic solvent at room temperature with an ether selected from the group consisting of the lower alkyl ethers of aliphatic unsaturated alcohols having more than eight carbon atoms and the lower alkyl ethers of aliphatic polyhydroxy alcohols having more than 8 carbon atoms, said ether having at least one free group esterifiable with sulphuric acid.

5. The process of preparing wetting and dispersing agents comprising reacting a sulphonating and sulphating agent in excess in the presence of a water-fixing agent selected from the group consisting of organic and inorganic acid anhydrides and acid chlorides, with an ether selected from the group consisting of the lower alkyl ethers of aliphatic unsaturated alcohols having more than eight carbon atoms and the lower alkyl ethers of aliphatic polyhydroxy alcohols having more than 8 carbon atoms, said ether having at least one free group esterifiable with sulphuric acid.

6. A composition of matter suitable as a wetting and dispersing agent comprising essentially sulphuric reaction products of a lower alkyl ether of an alcohol selected from the group consisting of aliphatic unsaturated alcohols and aliphatic polyhydroxy alcohols, said alcohol having more than eight carbon atoms.

7. A composition of matter suitable as a wetting and dispersing agent comprising essentially a sulphonated lower alkyl ether of an alcohol selected from the group consisting of aliphatic unsaturated alcohols and aliphatic polyhydroxy alcohols, said alcohol having more than eight carbon atoms.

8. A composition of matter suitable as a wetting and dispersing agent comprising essentially a sulphated lower alkyl ether of an alcohol selected from the group consisting of aliphatic unsaturated alcohols and aliphatic polyhydroxy alcohols, said alcohol having more than eight carbon atoms.

9. The process as described in claim 1 wherein the reaction product is contacted with ice, washed to remove the excess acid and finally neutralized with soda lye.

10. The process of preparing wetting and dispersing agents comprising reacting a sulphonating and sulphating agent in the presence of an anhydrous acid radical compound having water-fixing properties with an ether selected from the group consisting of the lower alkyl ethers of aliphatic unsaturated alcohols having more than eight carbon atoms and the lower alkyl ethers of aliphatic polyhydroxy alcohols having more than 8 carbon atoms, said ether having at least one free group esterifiable with sulphuric acid.

11. A composition of matter suitable as a wetting and dispersing agent comprising essentially a sodium salt of a sulphuric reaction product of a lower alkyl ether of an alcohol selected from the group consisting of aliphatic unsaturated alcohols and aliphatic polyhydroxy alcohols, said alcohol having more than eight carbon atoms.

12. A new compound consisting of a sodium salt of the sulphuric acid ester of octadecenyl-n-butylether.

13. A new compound consisting of a sodium salt of the sulphuric acid ester of octadecylene glycol monomethylether.

14. A new compound comprising essentially, a sodium salt of the sulphonic acid derivative of octadecenyl-isopropylether.

HEINRICH BERTSCH.